(12) United States Patent
Locascio

(10) Patent No.: US 6,603,757 B1
(45) Date of Patent: Aug. 5, 2003

(54) VOICE-DATA ACCESS CONCENTRATOR FOR NODE IN AN EXPANDABLE TELECOMMUNICATIONS SYSTEM

(75) Inventor: Timothy Ray Locascio, Osterville, MA (US)

(73) Assignee: Excel Switching Corporation, Hyannis, MA (US)

( * ) Notice: Subject to any disclaimer, the term of this patent is extended or adjusted under 35 U.S.C. 154(b) by 0 days.

(21) Appl. No.: 09/291,889

(22) Filed: Apr. 14, 1999

(51) Int. Cl.[7] .............................................. H04L 12/66
(52) U.S. Cl. ...................................... 370/352; 370/401
(58) Field of Search ................................ 370/352, 353, 370/354, 355, 356, 465, 466

(56) References Cited

U.S. PATENT DOCUMENTS

| | | | |
|---|---|---|---|
| 4,903,261 A | | 2/1990 | Baran et al. ................. 370/94.2 |
| 5,544,163 A | | 8/1996 | Madonna .................... 370/60.1 |
| 6,005,841 A | * | 12/1999 | Kicklighter ................. 370/217 |
| 6,026,087 A | * | 2/2000 | Mirashrafi et al. ........... 370/352 |
| 6,134,235 A | * | 10/2000 | Goldman et al. ............ 370/352 |
| 6,141,341 A | * | 10/2000 | Jones et al. ................. 370/352 |
| 6,253,249 B1 | * | 6/2001 | Belzile ....................... 370/259 |
| 6,278,707 B1 | * | 8/2001 | MacMillan et al. .......... 370/352 |
| 6,298,062 B1 | * | 10/2001 | Gardell et al. .............. 370/401 |
| 6,333,931 B1 | * | 12/2001 | LaPier et al. ................ 370/352 |
| 6,345,047 B1 | * | 2/2002 | Regnier ...................... 370/352 |
| 6,347,085 B2 | * | 2/2002 | Kelly ......................... 370/352 |
| 6,363,065 B1 | * | 3/2002 | Thornton et al. ........... 370/352 |

FOREIGN PATENT DOCUMENTS

WO     WO99/05830     2/1999

* cited by examiner

*Primary Examiner*—Chau Nguyen
*Assistant Examiner*—Keith M. George

(57) ABSTRACT

Apparatus operable as a standalone, open programmable switch, a node an expandable telecommunications system, or a gateway includes a voice/data access concentrator (VDAC) card for providing voice over IP (Internet protocol) capability. The VDAC card includes an array of digital signal processors (DSPs) which may be programmed to perform desired protocol conversions between circuit-based protocols, such as T1, E1 or J1, and packet-based protocols, such as IP. The apparatus is scalable and may readily incorporate other cards which provide both subscriber supplementary services and network signalling as required to meet the needs of a particular application.

4 Claims, 4 Drawing Sheets

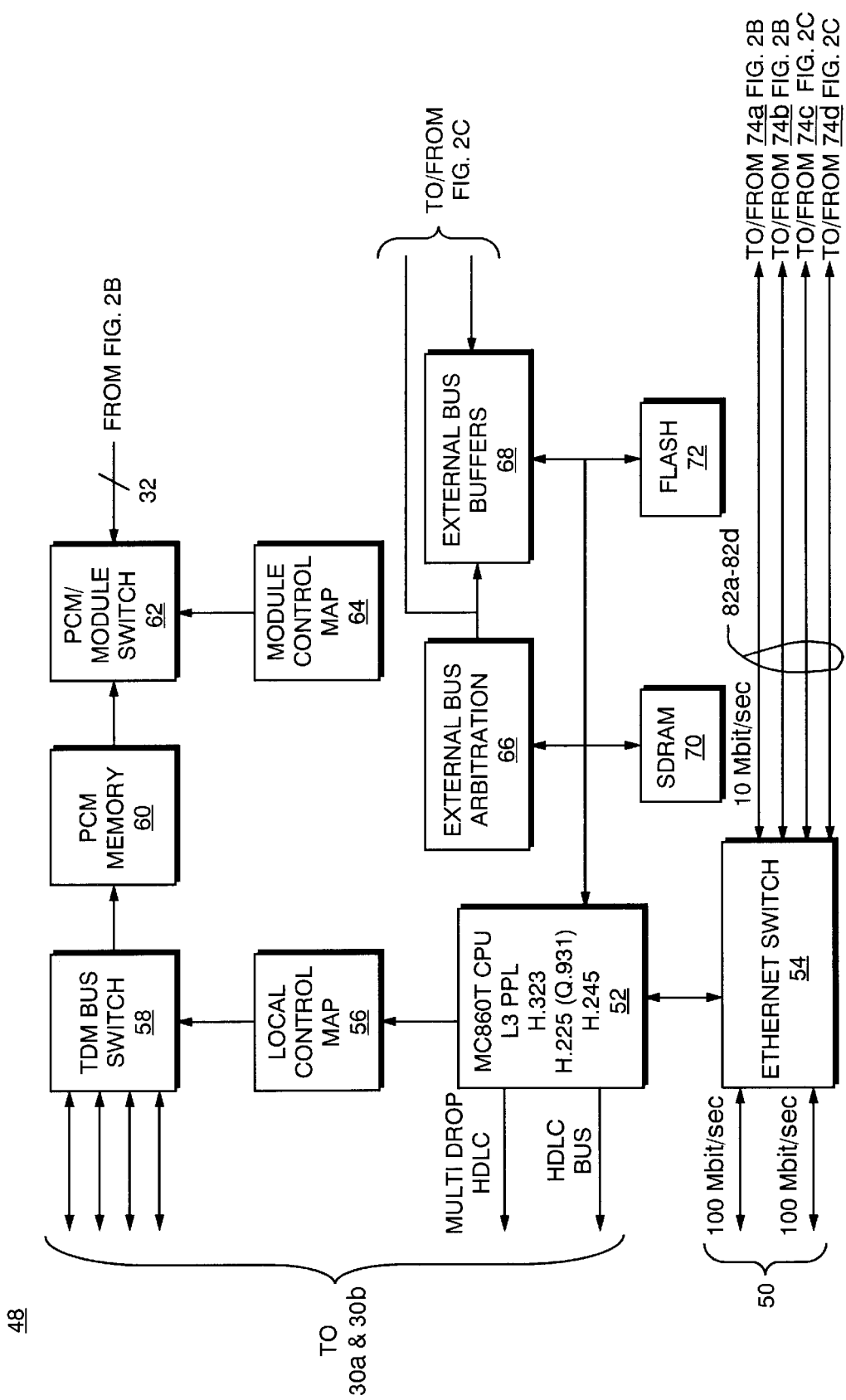

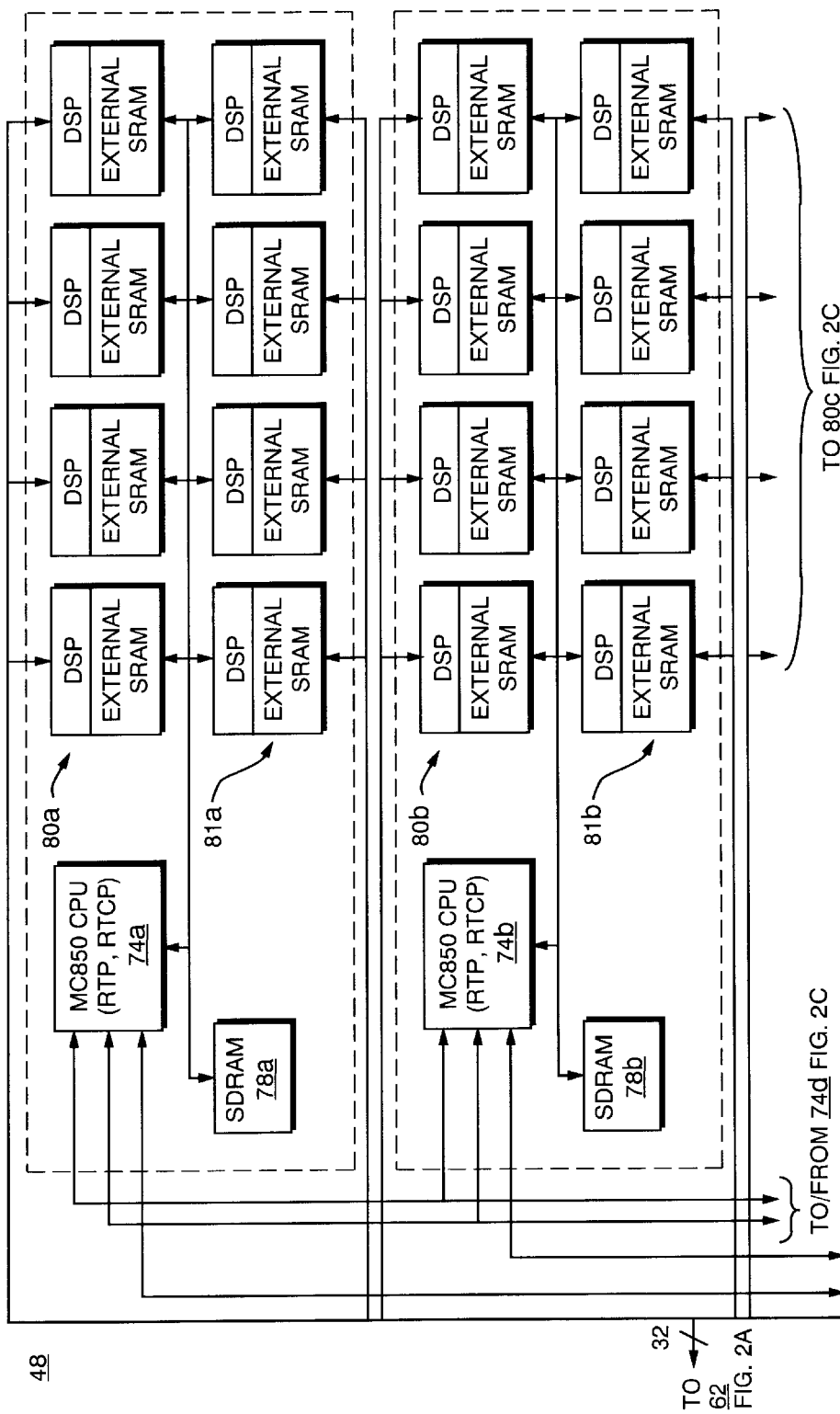

VOICE-DATA ACCESS CONCENTRATOR FOR NODE IN AN EXPANDABLE TELECOMMUNICATIONS SYSTEM

BACKGROUND OF THE INVENTION

1. Field of the Invention

The present invention relates generally to the field of telecommunications and, more specifically, to a programmable telecommunications switch which is operable as a node in an expandable telecommunications system and includes an interface for conducting telecommunications over the Internet.

2. Discussion of the Related Art

With the goal of providing telecommunication services at lower prices than those charged by long distance carriers, competitive local exchange carriers (CLECs) and government-controlled telephone companies, an effort is underway to use the Internet to carry voice traffic which has traditionally been carried by the public switched telephone network (PSTN). This type of application or service is often referred to as "voice over IP" (VoIP) where "IP" refers to Internet protocol.

Several important considerations arise in connection with the development of VoIP including determining how much, if any, of a communication path from a given subscriber to another should be provided by the PSTN and how much should be provided by the Internet. In other words, should a subscriber's communication device interface directly with the Internet (meaning that subscribers must be equipped with "Internet telephones," PCs which include telephone functionality or the like), or should the PSTN be used to connect subscribers (who would continue to use conventional telephone sets) to the Internet through a gateway or similar device. Of course, other scenarios are possible as well, and it is likely that a mixed or hybrid infrastructure will exist for a long time because of the prohibitive cost of constructing or replacing networks as well as replacing subscriber equipment.

Another consideration is how to provide supplementary or enhanced services to subscribers who will not want to sacrifice call forwarding, call-waiting, voicemail, conference calling and other existing services merely to obtain lower cost Internet-based phone service. Further, there is great need for system flexibility to allow rapid, inexpensive development and introduction of new services, largely because such new services provide large revenue growth potential for most carriers.

A third consideration is system capacity and scalability. Because of the difficulty in accurately forecasting both the demand for additional telecommunication bandwidth and the rate at which subscribers will migrate to Internet-based telephony, it is extremely important that any system be capable of rapid, large-scale expansion without significant disruption of service and without forcing large initial investment for capacity that may not be needed for a long time.

SUMMARY OF THE INVENTION

In brief summary, the present invention provides a programmable telecommunication switch, operable as a node in an expandable telecommunications system, as a standalone switch, or as a gateway. The programmable switch includes an interface, sometimes referred to as a voice/data concentrator card, for conducting VoIP communications. One side of the interface connects to the Internet or other packet-based network, while the other side of the interface connects with the switch's internal bus structure over which the interface and other circuitry within the switch may communicate.

The present invention permits a CLEC, system integrator or other customer to introduce VoIP capability as either an addition to an existing network (e.g., PSTN) or through the construction of a new network as desired. In either case, the present invention allows the introduction of VoIP capability in the locations and amounts needed to satisfy demand. Future growth in demand for such capacity is flexibly accommodated by simply including additional interfaces within the switch or adding additional nodes as the case may be. If desired, multiple interfaces may be concentrated in a single node whose VoIP capability is fully accessible by the other nodes of the expandable telecommunications system. Similar considerations apply to using the present invention to provide communications based on protocols other than IP.

In addition, traditional telephony services and functions, including both supplementary services (conferencing, call waiting, voicemail, etc.) and network signalling (tone detection, tone generation, etc.), as well as new services, may be provided within the same programmable switch which includes a VoIP capability or within other nodes that are part of the same expandable telecommunications system.

BRIEF DESCRIPTION OF THE DRAWINGS

The invention description below refers to the accompanying drawings, of which:

FIGS. 2A–2C together form a block diagram of the voice/data access concentrator card of FIG. 1 in further detail in accordance with a preferred embodiment of the invention.

DETAILED DESCRIPTION OF AN ILLUSTRATIVE EMBODIMENT

Figure 1:
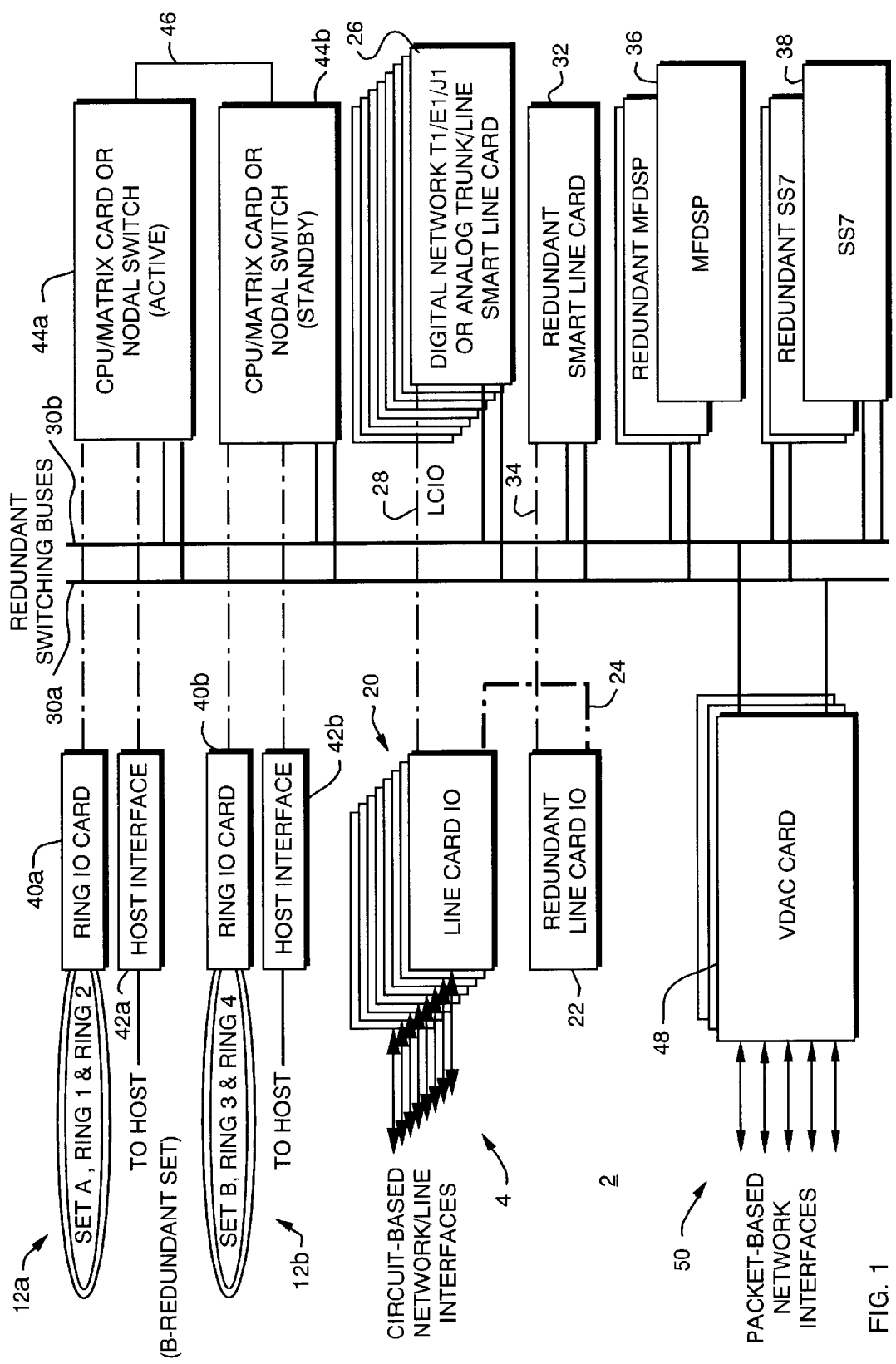
FIG. 1 is block diagram of a programmable telecommunication switch which is operable as a standalone device, a node in an expandable telecommunications system or as a gateway, and which is constructed in accordance with a preferred embodiment of the present invention.

FIG. 1 shows the major functional components of a preferred embodiment of a programmable telecommunications switch 2 in which the present invention may be implemented. Circuit-based network/line interfaces 4, which may represent links to a public switched telephone network (PSTN) or private circuit-based/circuit-switched network (or both), are provided by a series of line card input/output (IO) cards 20. If desired, a redundant IO card 22 and redundant IO bus 24 may optionally be included.

One or more digital network (T1, E1 or J1) or analog trunk/line line cards 26 communicate with IO cards 20 over line card (LC) IO lines 28. Line cards 26 are also connected in communicating relationship with redundant switching buses 30a and 30b. Again, if desired, one or more redundant line cards 32 may be provided, such redundant line cards arranged to communicate with a redundant IO card 22 over redundant LC IO lines 34.

If desired, diverse, programmable communications services such as tone detection and generation, sub-rate switching, conferencing, voice recorded announcements, call progress analysis, speech recognition, ADPCM compression, interactive voice response (IVR) and many others may be provided by one or more multifunction digital signal processing (MFDSP) cards 36 and optional redundant cards.

If desired, a Signalling System No. 7 (SS7) card 38 supports communications over network/line interfaces 4 using the SS7 protocol. As noted above with respect to other types of cards, one or more optional redundant SS7 cards 38 may be provided within switch 2.

One or more voice/data access concentrator (VDAC) cards 48 (which may include an optional n+1 VDAC card) are connected in communicating relationship with switching buses 30a and 30b. VDAC cards 48 provide packet-based network interfaces 50 for connection with the Internet (not shown) or other packet-based networks whose communication protocols are supported by cards 48.

It should be understood that by providing other types of cards within switch 2, other communication protocols such as ISDN, DS3, SONET, ATM or others may also be supported by switch 2.

Control of the operations of switch 2, as well as the actual switching functions, are performed by either a CPU/matrix card or nodal switch 44a. If a CPU/matrix card is used, switch 2 may operate essentially as a standalone device (i.e., as opposed to operating as a switching node in an expandable telecommunications system, described below) or as a gateway between PSTN network/line interfaces 4 and packet-switched network interfaces 50. In that case, the CPU/matrix card 44a may be connected to a host interface 42a through which communications with an external host device (not shown) are effected. Typically, but not necessarily, the overall operations of switch 2 are controlled by an application program running on the host device.

Alternatively, if a nodal switch is used, switch 2 may operate as a node in an expandable telecommunications system, an example of which is described in U.S. Pat. No. 5,544,163 which is hereby incorporated by reference. In such an embodiment, the nodal switch 44a is preferably connected with a ring IO card 40a through which communications with an inter-nodal network 12a are effected. Inter-nodal network 12a is preferably implemented with one or more fiber optic rings. Inter-nodal network 12b is a redundant set of one or more fiber optic rings. The nodal switch 44a may also communicate with an external host via host interface 42a.

Regardless of whether a CPU/matrix card or a nodal switch is selected, a matching standby CPU/matrix card or nodal switch 44b may optionally be provided and accompanied by the appropriate host interface 42b or ring IO card 40b (or both). In such a configuration, a link 46 is provided for direct communication between active and standby devices 44a and 44b.

Details of the construction and operation of an exemplary CPU/matrix card, as well as switching buses 30a and 30b, may be found in U.S. Pat. No. 5,349,579 which is hereby incorporated by reference. Similarly, details of the construction and operation of an exemplary nodal switch may be found in the above-referenced U.S. Pat. No. 5,544,163.

Figure 2C:
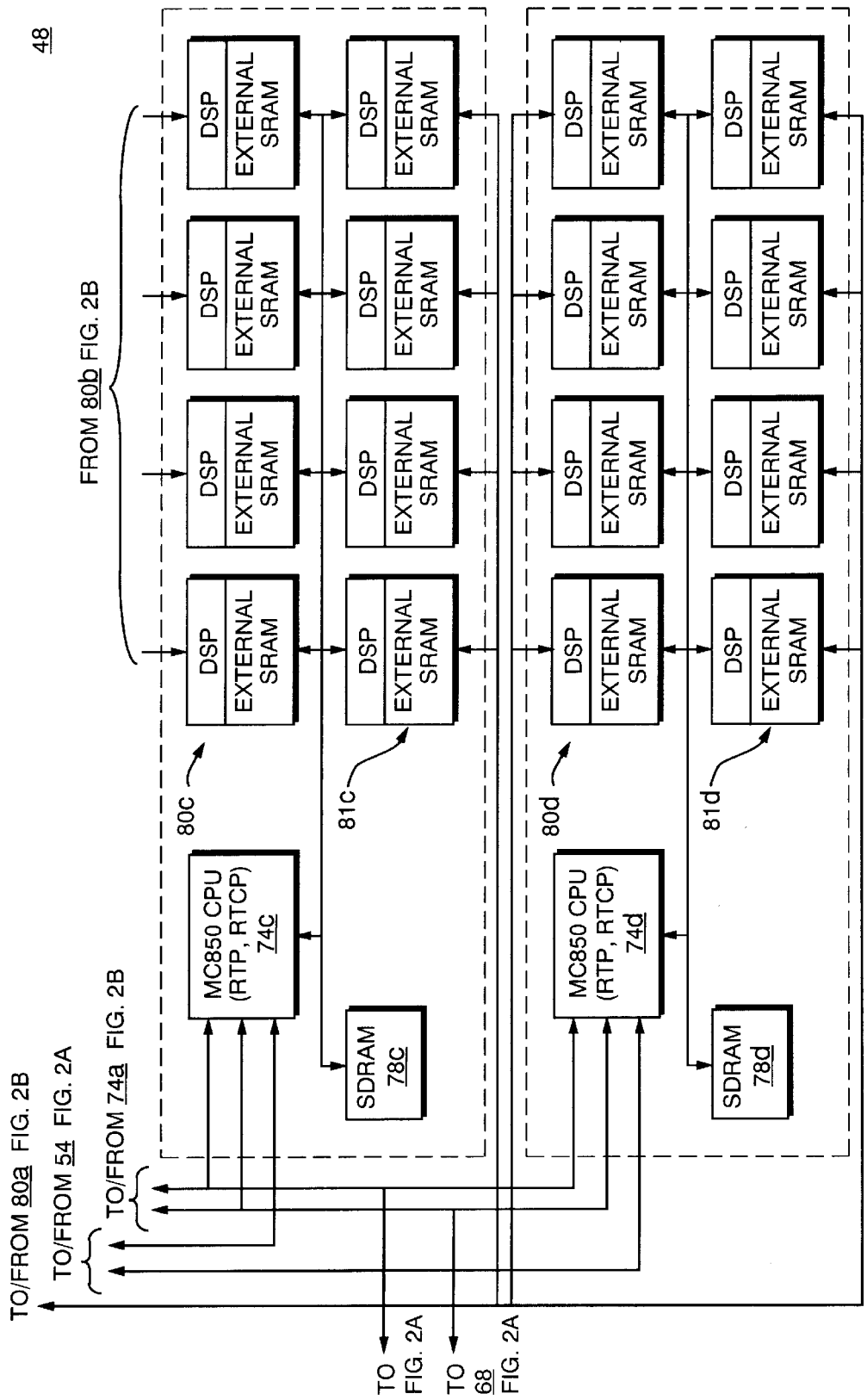

FIG. 2 is a detailed block diagram of VDAC card 48 shown in FIG. 1. An ethernet switch 54 provides dual network interfaces 50 which are capable of operating at 100 Mbit/sec. Ethernet switch 54 is interfaced with a CPU 52, which is preferably a Motorola MC860, that controls overall operation of VDAC card 48. CPU 52 communicates over dual HDLC buses which are part of switching buses 30a and 30b.

A local control map 56, which is under the control of CPU 52, operates in conjunction with a time division multiplex (TDM) bus switch 58, to time switch data (timeslots) between switching buses 30a and 30b and VDAC card 48.

Timeslots which is are received from buses 30a and 30b, via TDM bus switch 58, are passed to PCM memory 60 and then to PCM/module switch 62, whose operation is controlled by module control map 64.

As the timeslots are passed through switch 62, they are routed to one of eight Texas Instruments TI320C549 Digital Signal Processors (DSPs) 80a–80d on one of four VoIP daughter cards (each is denoted by a dashed line box). Each daughter card includes eight DSPs [and their] 80a–80d, each with its own external SRAM 81a–81d. The DSPs are memory mapped into the address space of a Motorola MC850 processor 74a–74d, used to control the operation of the daughter card, which has its own local SDRAM 78a–78d and flash memory (not shown). Each processor 74a–74d has a 10 Mbit/sec full duplex [ethernet]Ethernet pipe to [ethernet]Ethernet switch 54 which allows for communication among all of the daughter cards, CPU 52 and the external IP network.

CPU 52 is also connected in communicating relationship with external bus arbitration logic 66, external bus buffers 68, SDRAM 70 and flash memory 72.

In general, VDAC card 48 functions to provide internetworking between packet-switched or packet-based communication protocols (e.g., IP) that are typically used to effect communications over network interfaces 50, and circuit-switched or circuit-based communication protocols (i.e., T1, E1 or J1) that are typically used to effect communications over network/line interfaces 4 (FIG. 1). DSPs 74a–74d, along with their related circuitry, operate to perform the necessary steps, including packetizing and depacketizing, digital processing of data and the like, to convert from one protocol to another. For example, by loading appropriate software into memories 70 and 72, CPU 52 may simultaneously run H.323, H.225 (Q.931) and H.245 protocols or a variety of other protocols chosen to meet the needs of a particular application, thereby enabling. VDAC card 48 to support communications which use any of those protocols. Such protocol software may be obtained from commercial sources, one such source for H.323 software being RADVision Inc. of Mahwah, N.J.

With reference to FIGS. 1 and 2A–2C, an example of the protocol conversion that may be performed will now be described. Assure that one or more T1 spans are connected to circuit-based network/line interfaces 4. Further assume that packet-based network interfaces 50 are connected to the Internet for the purpose of providing VoIP service within switch 2. As timeslots (e.g., PCM data) which are destined for the Internet arrive at T1 line cards 26 (or smart line cards 32), they are transmitted over switching buses 30a and 30b to TDM bus switch 58 on VDAC card 48. TDM bus switch 58 time switches those time slots to PCM memory 60, from which they pass through PCM/module switch 62 and then to designated areas of DSP external SRAM 81a–81d. Once stored in SRAM 81a–81d, the timeslots are available for processing by the respective one of DSPs [74a–74d] 80a–80d that has access to such SRAM. Such processing may typically include packetization of the timeslots as data within IP packets, which packets are then passed via the processor 74a–74d through the [ethernet] Ethernet buses 82a–82d to [ethernet] Ethernet switch 54 for transmission to the Internet.

It will be understood by those skilled in the art that VDAC card 48 may also perform a protocol conversion which is essentially the reverse of the process just described, that is, receiving Internet packets containing timeslots at ethernet switch 54, depacketizing the timeslots, and passing those timeslots via TDM bus switch 58 to switching buses 30*a* and 30*b*, over which such timeslots may be passed to line cards 26, MFDSP cards 36, SS7 cards 38 CPU/matrix cards or nodal switches 44*a* and 44*b*.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. Apparatus operable as a switching node in an expandable telecommunications system, which system includes a plurality of switching nodes interconnected by an associated inter-nodal network, each switching node being capable of dynamically connecting or disconnecting communications paths with respect to various ones of a plurality of ports, said switching node comprising:
   (A) one or more nodal switches each of which includes circuitry for transmitting and receiving information over the inter-nodal network to which the switching node and other nodes of said system are connected in communicating relationship, and said nodal switch including a time switch for time-switching information in time slots to or from said ports, and including circuitry for transmitting and receiving information in time slots in a packet over the internodal network to which said switching node and other switching nodes are connected in a communicating relationship;
   (B) one or more line cards, connected in communicating relationship with said one or more nodes for interfacing the node with one or more circuit-switched networks over which communications are conducted using circuit-switched protocols; and
   (C) a voice/data access concentrator card, connected in communicating relationship with said one or more nodal switches, and that includes an interface to one or more packet-switched networks over which communications are conducted using packet-switched protocols including Internet protocol, said interface including one or more digital signal processors for converting information between said circuit-switched protocols and said packet-switched protocols, including means for converting information received through said packet-switched network into circuit-switched data and converting circuit-switched data into information for transmission through said packet-switched network whereby the switching node provides internetworking between a circuit-switched protocol and a packet-switched protocol, including sending voice over Internet information therebetween, and
said voice data access concentrator card having associated therewith an Ethernet switch that provides dual network interfaces with said one or more packet-switched networks, and said Ethernet switch having an associated CPU to control operation of said card, and said associated CPU being in communicating relationship with components in said switching node over dual HDLC buses incorporated into redundant internal switching buses in said switching node.

2. The switching node as defined in claim 1 further comprising
   a local control map, which is under the control of said CPU associated with said Ethernet switch, said local control map operating in conjunction with a time division multiplex (TDM) bus switch for time-switching timeslots between internal switching buses of said switching node and said voice data access concentrator card.

3. The switching node as defined in claim 2 further comprising:
   a plurality of VoIP daughter cards, each including:
      (i) at least one of said digital signal processors; and
      (ii) an external memory storage device associated with each digital signal processor, and said digital signal processors are memory mapped into an address space of an associated processor that is programmed to control operation of the daughter card with which it is associated, said processor also having a full duplex Ethernet pipe to Ethernet switch 54 for communication among said daughter cards, the CPU and said packet-switched IP network.

4. The switching node as defined in claim 1, wherein said node is a services node that is adapted to provide at least one of the following: a) a voice mail services; b) interactive voice response services; c) voice messaging services; d) call waiting; e) wireless communications services; e) personal communications services PCS; and f) conferencing.

* * * * *